(12) United States Patent
Panteleev

(10) Patent No.: US 9,471,310 B2
(45) Date of Patent: Oct. 18, 2016

(54) METHOD, COMPUTER PROGRAM PRODUCT, AND SYSTEM FOR A MULTI-INPUT BITWISE LOGICAL OPERATION

(71) Applicant: NVIDIA Corporation, Santa Clara, CA (US)

(72) Inventor: Alexey Yuryevich Panteleev, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 668 days.

(21) Appl. No.: 13/685,611

(22) Filed: Nov. 26, 2012

(65) Prior Publication Data

US 2014/0149721 A1    May 29, 2014

(51) Int. Cl.
*G06F 9/30* (2006.01)
*G06F 9/38* (2006.01)

(52) U.S. Cl.
CPC ......... *G06F 9/30029* (2013.01); *G06F 9/3851* (2013.01)

(58) Field of Classification Search
None
See application file for complete search history.

(56) References Cited

U.S. PATENT DOCUMENTS

| | | | | |
|---|---|---|---|---|
| 6,976,155 | B2* | 12/2005 | Drysdale et al. | 712/225 |
| 7,769,982 | B2* | 8/2010 | Yehia | G06F 9/30181 712/34 |
| 8,131,661 | B2* | 3/2012 | Ganai | G06F 17/11 706/45 |
| 8,281,111 | B2* | 10/2012 | Plondke et al. | 712/223 |
| 8,464,031 | B2* | 6/2013 | Gonion | 712/222 |
| 9,092,345 | B2* | 7/2015 | Nystad | G06F 12/0815 |
| 9,148,151 | B2* | 9/2015 | Teig | H03K 19/1736 |
| 9,244,687 | B2* | 1/2016 | Toll | G06F 9/30018 |
| 2006/0136915 | A1* | 6/2006 | Aingaran | G06F 9/3842 718/100 |

(Continued)

FOREIGN PATENT DOCUMENTS

| | | |
|---|---|---|
| JP | 2011258147 A * | 12/2011 |
| WO | WO 2006136764 A1 * | 12/2006 |

OTHER PUBLICATIONS

'Garp: A MIPS Processor with a Reconfigurable Coprocessor' by John R. Hauser and John Wawrzynek, published in Proceedings of the IEEE Symposium on Field-Programmable Custom Computing Machines (FCCM '97, Apr. 16-18, 1997).*

(Continued)

*Primary Examiner* — Steven Snyder
(74) *Attorney, Agent, or Firm* — Zilka-Kotab, PC

(57) ABSTRACT

A method, computer program product, and system are provided for multi-input bitwise logical operations. The method includes the steps of receiving a multi-input bitwise logical operation instruction that specifies two or more input operands and a function operand, where a first input operand of the two or more input operands comprises a number of bits, each bit having a corresponding bit in each of the additional input operands in the two or more input operands. The function operand is written to a lookup table. Then, the lookup table is accessed for each set of corresponding input operand bits in the two or more input operands to generate an output for the multi-input bitwise logical operation instruction.

20 Claims, 6 Drawing Sheets

(56) References Cited

U.S. PATENT DOCUMENTS

| | | | |
|---|---|---|---|
| 2007/0106879 A1* | 5/2007 | Tanaka | G06F 9/3851 712/214 |
| 2008/0263332 A1* | 10/2008 | Yehia | G06F 9/30181 712/220 |
| 2010/0049951 A1* | 2/2010 | Gonion et al. | 712/222 |
| 2010/0077187 A1* | 3/2010 | Plondke et al. | 712/223 |
| 2011/0231636 A1* | 9/2011 | Olson et al. | 712/222 |
| 2012/0079244 A1* | 3/2012 | Forsyth | 712/208 |
| 2012/0216021 A1* | 8/2012 | Archer et al. | 712/223 |
| 2014/0095845 A1* | 4/2014 | Gopal et al. | 712/223 |
| 2014/0181484 A1* | 6/2014 | Callister | G06F 9/46 712/229 |
| 2014/0289503 A1* | 9/2014 | Toll | G06F 9/30018 712/226 |
| 2015/0046655 A1* | 2/2015 | Nystad | G06F 12/0815 711/125 |
| 2016/0154652 A1* | 6/2016 | Toll | G06F 9/30189 712/208 |

OTHER PUBLICATIONS

Wikipedia's Mask (computing) article archived from Oct. 2, 2012.*
'Understanding Bitwise Operators' by Jason Killian, Apr. 18, 2012.*
Japanese Patent Application, Machine Translation of JP 2011258147 A.*

* cited by examiner

METHOD, COMPUTER PROGRAM PRODUCT, AND SYSTEM FOR A MULTI-INPUT BITWISE LOGICAL OPERATION

FIELD OF THE INVENTION

The present invention relates to logical operations, and more particularly to hardware and software implementations of bitwise logical operations.

BACKGROUND

Bitwise logical operations perform functions on a single input or on two inputs, where each input is at least one bit. An example of a single input bitwise logical operation is NOT which inverts each hit of the single input, i.e., NOT 011 produces 100. An example of a two input bitwise logical operation is AND which performs an AND function on each corresponding bit pair of the two inputs, i.e., 011 AND 110 produces 010. Other two input bitwise logical operations include OR and XOR (exclusive OR).

While the one and two input bitwise logical operations are useful for many applications, some functions require more than two inputs. Thus, there is a need for addressing this issue and/or other issues associated with the prior art.

SUMMARY

A method, computer program product, and system are provided for multi-input bitwise logical operations. The method includes the steps of receiving a multi-input bitwise logical operation instruction that specifies two or more input operands and a function operand, where a first input operand of the two or more input operands comprises a number of bits, each bit having a corresponding bit in each of the additional input operands in the two or more input operands. The function operand is written to a lookup table. Then, the lookup table is accessed for each set of corresponding input operand bits in the two or more input operands to generate an output for the multi-input bitwise logical operation instruction.

DETAILED DESCRIPTION

When more inputs are needed for a bitwise logical operation, such as three inputs, several of the two input bitwise logical operation instructions may be used to perform the function. For example, the three input logical operation A & B & C=E where & is the bitwise logical AND operator may be implemented using two instructions to perform the following two input logical operations:

A&B=D

C&D=E

Each additional input over two requires at least one additional two input bitwise logical operation. For example, (A&B)|(B&C) is a three input bitwise logical operation that requires three two input bitwise logical operations performed using three two input bitwise logical operation instructions.

When circuitry is configured to perform the two input bitwise logical operation, the output from the first two input bitwise logical operation is provided as an input to the circuitry to perform the second two input bitwise logical operation. Therefore, the time needed to perform a three input bitwise logical operation may be twice the time needed to perform a two input bitwise logical operation or more in case of complex three input operations. An approach is described for performing multi-input bitwise logical operations using look-up table circuitry.

A multi-input bitwise logical operation instruction is provided that computes an arbitrary bitwise logical function on two or more input operands. The bitwise logical function to be computed is specified as a $2^N$-bit lookup table that is provided as an additional operand to the instruction, where N=the number of input operands. The definition of a three input version of the multi-input bitwise logical operation instruction, LOP3 is:

LOP3 Rd, Ra, Rb, Rc, Imm8;

Rd is the destination register where the computed output is stored. Ra, Rb, and Rc are the input operands, and the 8-bit operand Imm8 defines the bitwise logical function.

Figure 1:
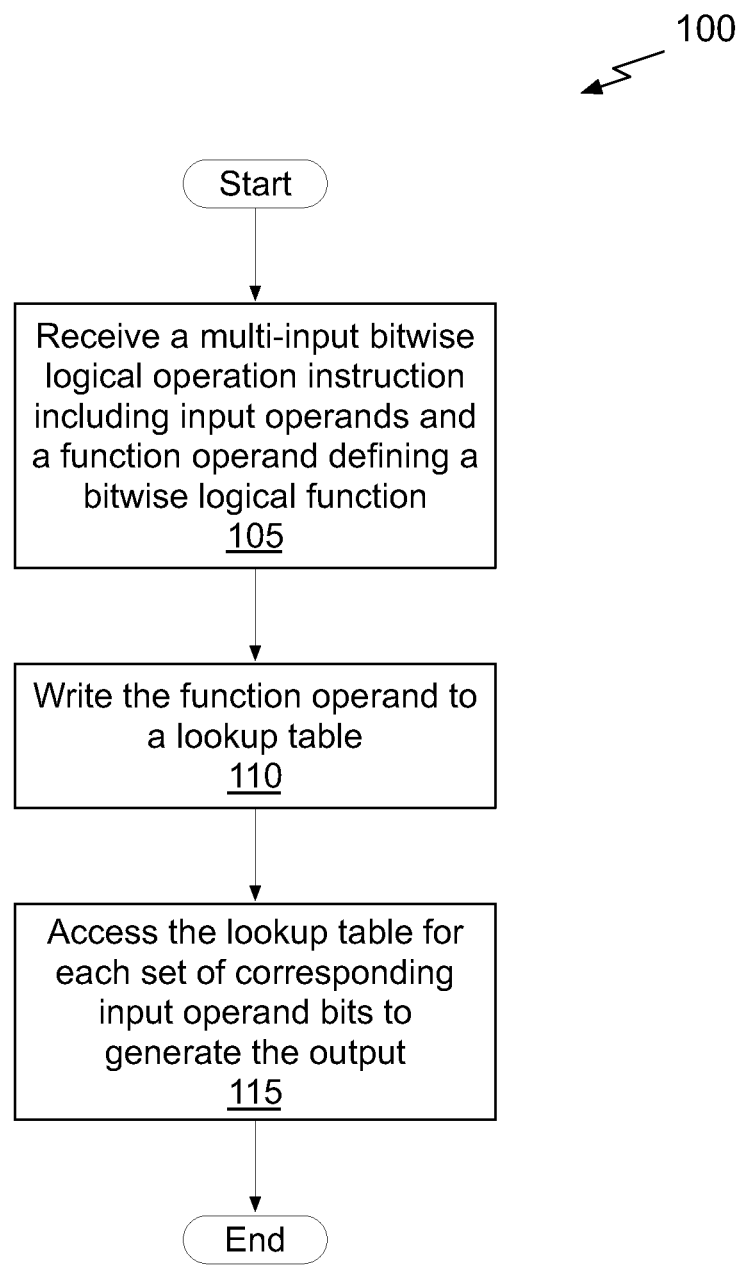
FIG. 1 illustrates a flowchart of a method for performing a bitwise logical operation, in accordance with one embodiment.

FIG. 1 illustrates a flowchart of a method 100 for performing a bitwise logical operation, in accordance with one embodiment. At step 105, a multi-input bitwise logical operation instruction is received. The multi-input bitwise logical operation instruction specifies two or more input operands and a function operand that defines a bitwise logical function to be performed on the input operands. At step 110, the function operand is written to a lookup table. Then, at step 115, the lookup table is accessed for each set of corresponding input operand bits to generate the output for the multi-input bitwise logical operation instruction. For example, to generate bit 0 of the output (e.g., Rd[0]) the set of corresponding input operand bits (e.g., Ra[0], Rb[0], and Rc[01]) is used to access the lookup table. In one embodiment, the lookup table is accessed by one set of corresponding operand bits to generate a single bit of the output. Therefore, the lookup table is accessed M times to generate an M-bit output.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Certain algorithms, particularly cryptographic algorithms, can benefit from bitwise logical operation instructions having three or more input operands. The number of instructions needed to perform the algorithm may be reduced when bitwise logical operation instructions having three or more input operands are available compared with using bitwise logical operation instructions having less than three input operands. Also, when circuitry is configured to perform bitwise logical operations for three or more input operands directly, the algorithm may be executed in less time compared with using bitwise logical operation instructions having less than three input operands. Therefore, a multi-input bitwise logical operation instruction accepting three or more input operands may improve the performance of some algorithms, particularly cryptographic algorithms.

When three input operands are provided, the number of bits in the lookup table is $2^3$ and the number of different logical functions that may be performed is $2^8$. The lookup table (LUT) may be configured via the function operand to perform any of the $2^8$ different logical functions. For each individual bit i, the result Rd[i]=LUT[ {Ra[i], Rb[i], Rc[i]}], where {Ra[i], Rb[i], Rc[i]} is the concatenation of the corresponding bit from each input operand, i.e., the set of corresponding input operand bits.

TABLE 1 illustrates some of the different logical functions that may be defined by the function operand, where ^ is a bitwise logical XOR operator, & is a bitwise logical AND operator, | is a bitwise logical OR operator, and ~ is a bitwise logical NOT operator.

TABLE 1

| Logical function | LUT (Imm8) value LUT[7], ... LUT[0] |
| --- | --- |
| A & B & C | 10000000 |
| A \| B \| C | 11111110 |
| A ^ B ^ C | 10010110 |
| A & B | 11000000 |
| A & ~B & ~C | 00010000 |
| ~A \| B \| ~C | 11011111 |
| A ^ (B & (A ^ C)) | 10111000 |
| (A&B) \| (A&C) \| (B&C) | 11101000 |

Other logical functions performed by storing different value in the LUT as defined by the function operand.

Figure 3:
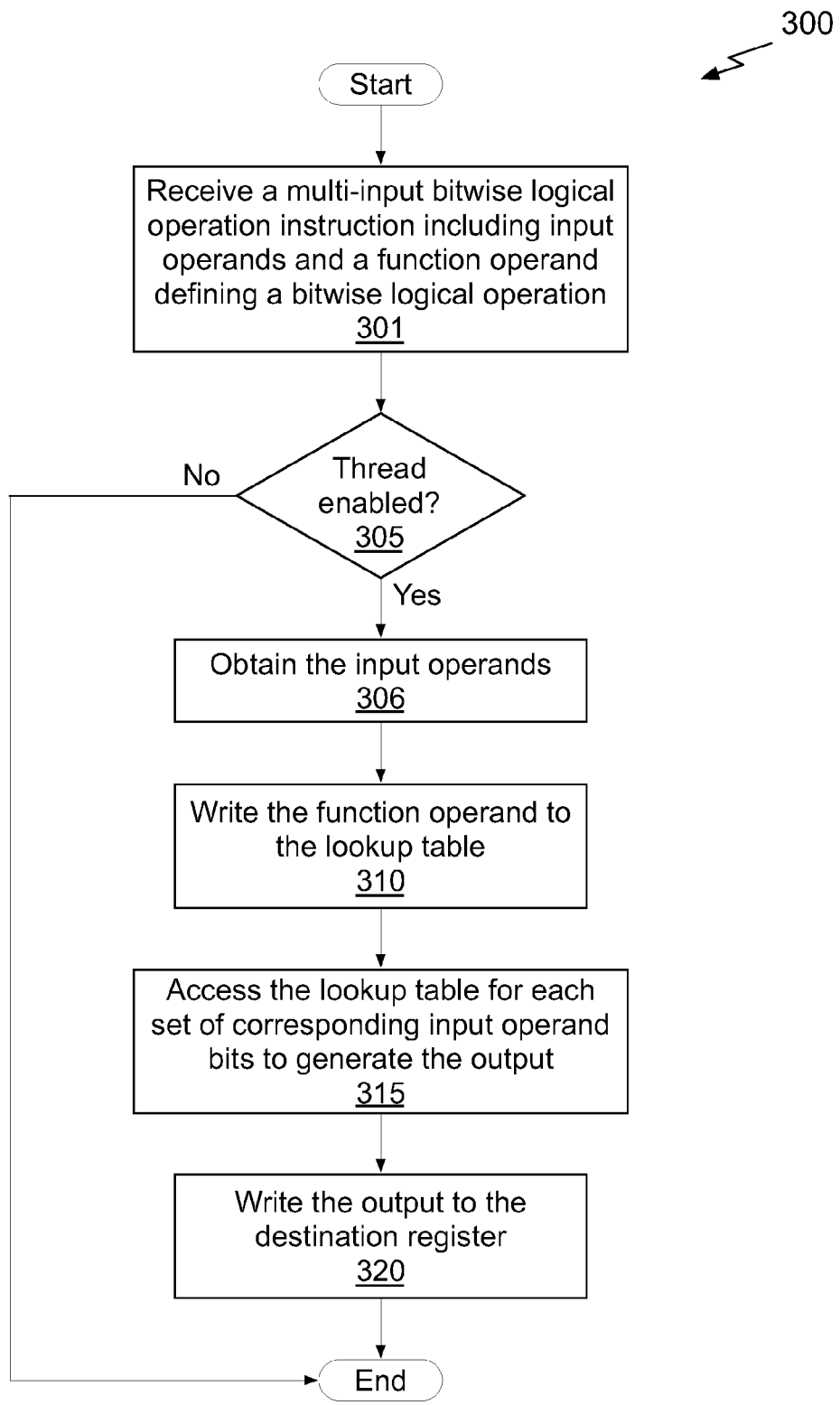
FIG. 3 illustrates a flowchart of another method for performing a bitwise logical operation, in accordance with one embodiment.

FIG. 3 illustrates a multi-input bitwise logical operation unit 200, in accordance with one embodiment. The multi-input bitwise logical operation unit 200 includes a LUT 215 and an 8-to-1 multiplexor 205 for each bit of the output 220. As shown, the output 220 is 32 bits and the 32 multiplexors 205, mux 205-0, 205-1, . . . to 205-31 each generate a bit of the 32-bit output 220, shown as bits D[0], D[1], . . . D[31]. In other embodiments, the output 220 may include fewer or more bits.

The three input operands, input operands 211, 212, and 213 correspond to the input operands Ra, Rb, and Rc. As shown, the input operands 211, 212, and 213 are each 32 bits, where the input, operand 211 includes bits A[0], A[1], . . . A[31], the input operand 212 includes bits B[0], B[1], . . . B[31], and the input operand 213 includes bits C[0], C[1], . . . C[31]. In other embodiments, the input operands 211, 212, and 213 may include fewer or more bits. Each one of the input operands 211, 212, and 213 may be obtained from a register that was written by an earlier instruction, obtained from a register that stores a constant value, or the input operand may be used directly. The function operand 210 may be used directly, obtained from a register that was written by an earlier instruction, or obtained from a register that stores a constant value. The function operand 210 is stored in the UT 215 that is accessed to provide the multi-input bitwise logical operation defined by the function operand 210 as an input to each of the multiplexors 205. As shown, the output of the LUT 215 is a 8 bit value, e.g., LUT[0], LUT[1], . . . LUT[7] because there are three input operands 211, 212, and 213. The LUT 215 may also be configured to perform a bitwise logical operation for only two of the three input operands.

Figure 2:
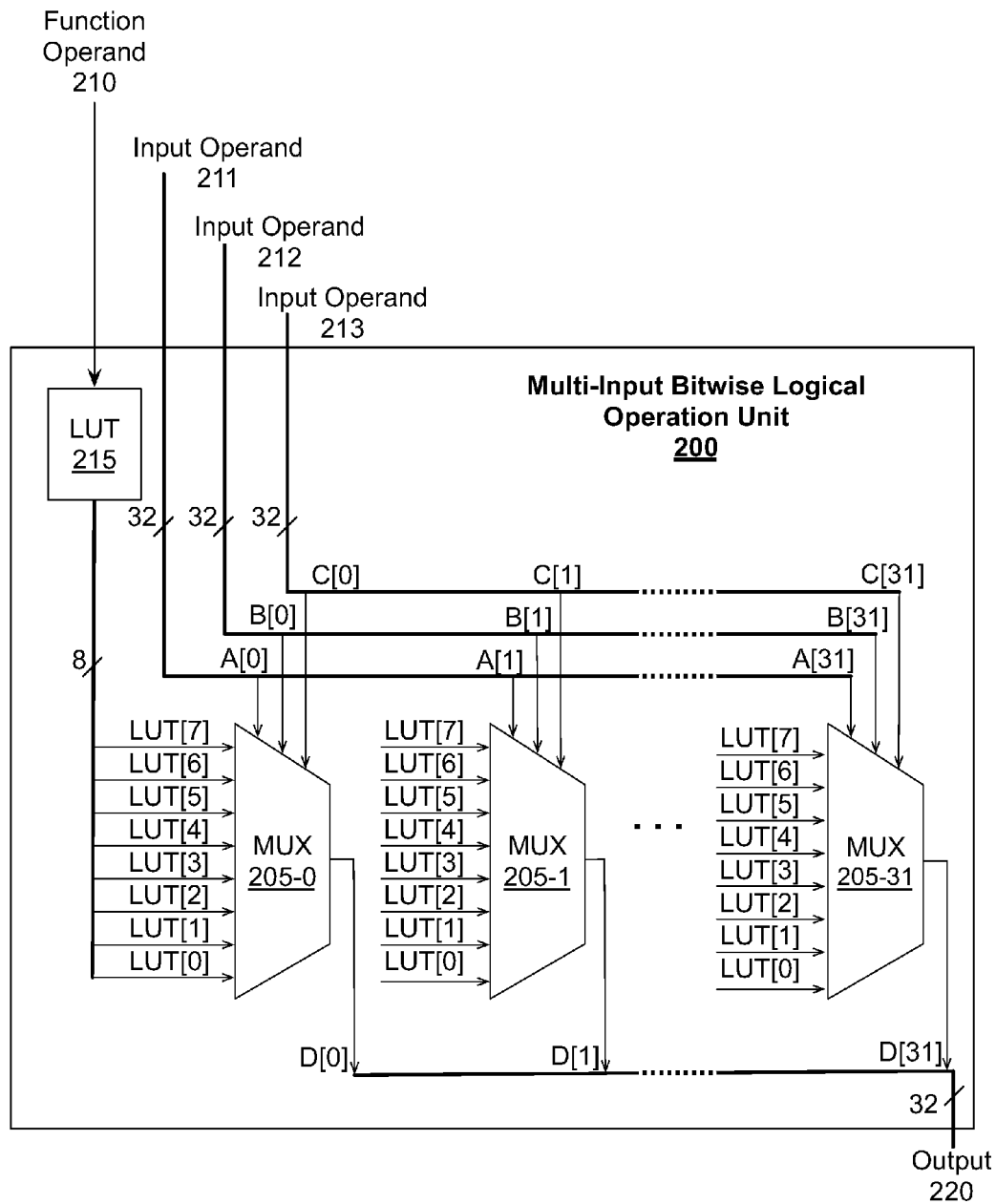
FIG. 2 illustrates a multi-input bitwise logical operation unit, in accordance with one embodiment.

TABLE 2 illustrates one example of Verilog code which may be used for generating at least a portion of the multi-input bitwise logical operation unit 200 in FIG. 2. Of course, it should be noted that the code set forth in TABLE 2 is for illustrative purposes only, and thus should not be construed as limiting in any manner.

TABLE 2

```
genvar Bit;
generate
   for (Bit = 0; Bit < 32; Bit = Bit + 1) begin: BIT
      assign Rd[Bit] = Imm8[ {Ra[Bit], Rb[Bit], Rc[Bit]} ];
   end
endgenerate
```

When executed in a multi-threaded processing architecture, two or more threads may be configured to execute the multi-input bitwise logical operation instruction in parallel. A predicate operation may be provided with the multi-input bitwise logical operation instruction to control whether each individual thread executes the instruction. For example, in one embodiment, a group of 32 threads may be configured to execute a stream of instructions in parallel and any number of the 32 threads may be disabled/enabled for execution of each instruction in the stream using the predicate operation.

TABLE 3 illustrates one example of pseudo code which may be used for performing a multi-input bitwise logical operation unit in a multi-threaded processing unit, according to the multi-input bitwise logical operation instruction LOP3 Rd, Ra, Rb, Ro, Imm8 Of course, it should be noted that the code set forth in TABLE 3 is for illustrative purposes only, and thus should not be construed as limiting in any manner.

TABLE 3

```
parallel_foreach_thread {
   if (predicate_test_fails( )) {
      break;
   }
   uint32 RaValue = READ_REGISTER(inst.Ra);
   uint32 RbValue = READ_REGISTER(inst.Rb);
   uint32 RcValue = READ_REGISTER(inst.Rc);
   uint8 lut = Imm8;
   uint32 result;
   parallel_for (bit = 0; bit <= 31; bit++) {
      uint3 index =
         (RaValue[bit]<<2) |
         (RbValue[bit]<<1) |
         (RcValue[bit]);
      result[bit] = lut[index];
   }
   WRITE_REGISTER(result, inst.Rd);
}
```

FIG. 3 illustrates a flowchart of a method 300 for performing a bitwise logical operation, in accordance with one embodiment. At step 301, a multi-input bitwise logical operation instruction is received by an instruction execution unit within a multi-threaded processing unit. At step 305, an instruction execution unit determines if execution of a multi-input bitwise logical operation instruction is enabled for the particular thread, and, if execution is not enabled, execution of the bitwise logical operation instruction for the particular thread is done. Otherwise, at step 306, the input operand values are obtained, e.g., are read from registers and/or extracted from the multi-input bitwise logical operation instruction. The multi-input bitwise logical operation instruction specifies two or more input operands and a function operand that defines a bitwise logical function to be performed on the input operands. At step 310, the function operand is written to the LUT 215 within the multi-input bitwise logical operation unit 200. Then, at step 315, the LUT 215 is accessed for each set of corresponding input operand bits to generate the output 220 for the multi-input bitwise logical operation instruction. At step 320, the output is written to the destination register (Rd) specified by the multi-input bitwise logical operation instruction.

It will be appreciated that the framework set forth above may be implemented in a multi-threaded architecture, such as a CPU that is configured to execute a plurality of threads using time slicing techniques. In one embodiment, the encoding process may be implemented using a highly parallel architecture such as a graphics processing unit that is configured to execute tens or hundreds of threads in parallel. The following description illustrates one such architecture that could be used to implement at least a portion of the framework set forth above.

Figure 4:
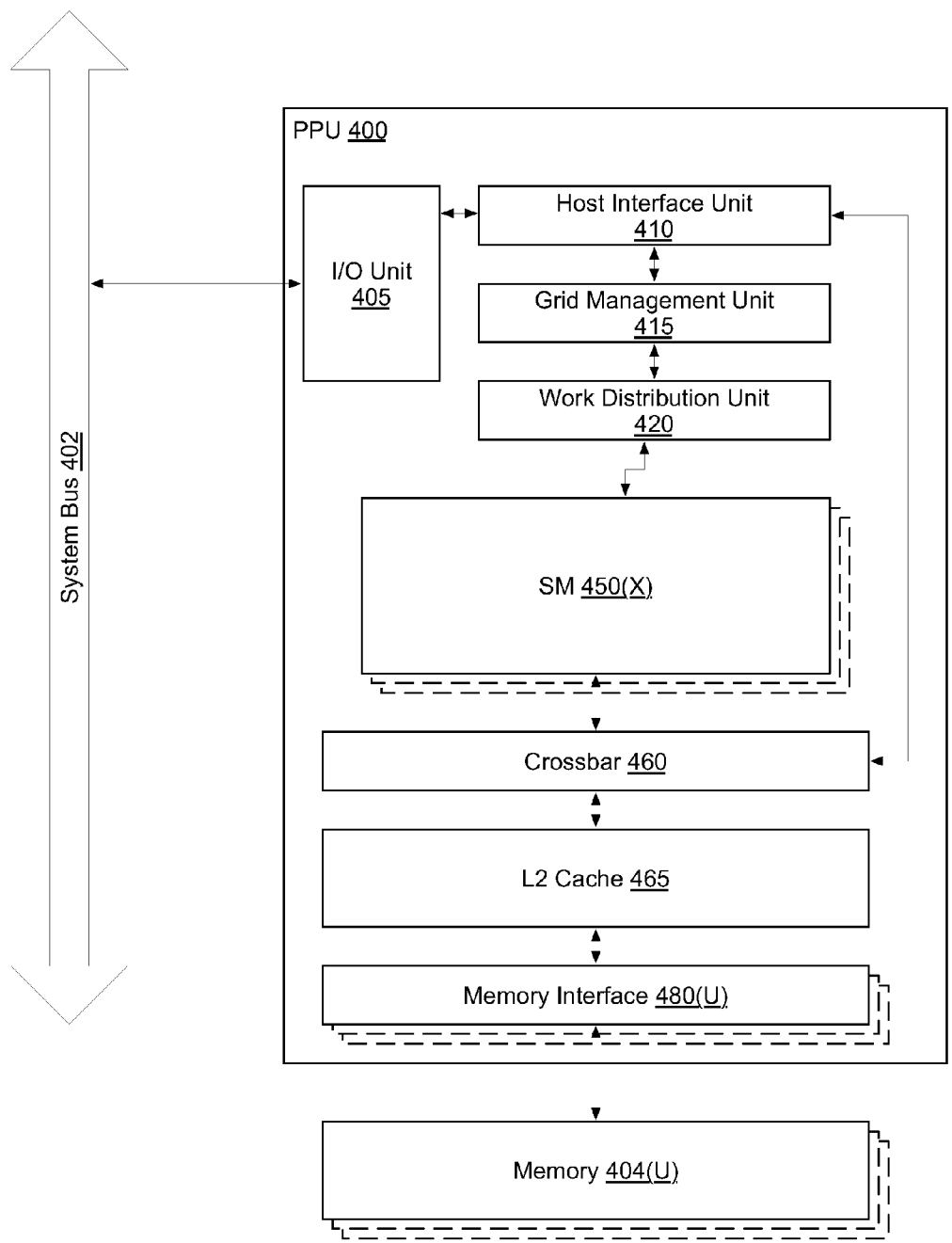
FIG. 4 illustrates a parallel processing unit (PPU), according to one embodiment.

FIG. 4 illustrates a parallel processing unit (PPU) 400, according to one embodiment. While a parallel processor is provided herein as an example of the PPU 400, it should be strongly noted that such processor is set forth for illustrative purposes only, and any processor may be employed to supplement and/or substitute for the same. In one embodiment, the PPU 400 is configured to execute a plurality of threads concurrently in two or more streaming multi-processors (SMs) 450. A thread (i.e., a thread of execution) is an instantiation of a set of instructions executing within a particular SM 450. Each SM 450, described below in more detail in conjunction with FIG. 5, may include, but is not limited to, one or more processing cores, one or more load/store units (LSUs), a level-one (L1) cache, shared memory, and the like.

In one embodiment, the PPU 400 includes an input/output (I/O) unit 405 configured to transmit and receive communications (i.e., commands, data, etc.) from a central processing unit (CPU) (not shown) over the system bus 402. The I/O unit 405 may implement a Peripheral Component Interconnect Express (PCIe) interface for communications over a PCIe bus. In alternative embodiments, the I/O unit 405 may implement other types of well-known bus interfaces.

The PPU 400 also includes a host interface unit 410 that decodes the commands and transmits the commands to the grid management unit 415 or other units of the PPU 400 (e.g., memory interface 480) as the commands may specify. The host interface unit 410 is configured to route communications between and among the various logical units of the PPU 400.

In one embodiment, a program encoded as a command stream is written to a buffer by the CPU. The buffer is a region in memory, e.g., memory 404 or system memory, that is accessible (i.e., read/write) by both the CPU and the PPU 400. The CPU writes the command stream to the buffer and then transmits a pointer to the start of the command stream to the PPU 400. The host interface unit 410 provides the grid management unit (GMU) 415 with pointers to one or more streams. The GMU 415 selects one or more streams and is configured to organize the selected streams as a pool of pending grids. The pool of pending grids may include new grids that have not yet been selected for execution and grids that have been partially executed and have been suspended.

A work distribution unit 420 that is coupled between the GMU 415 and the SMs 450 manages a pool of active grids, selecting and dispatching active grids for execution by the SMs 450. Pending grids are transferred to the active grid pool by the GMU 415 when a pending grid is eligible to execute, i.e., box no unresolved data dependencies. An active grid is transferred to the pending pool when execution of the active grid is blocked by a dependency. When execution of a grid is completed, the grid is removed from the active grid pool by the work distribution unit 420. In addition to receiving grids from the host interface unit 410 and the work distribution unit 420, the GMU 410 also receives grids that are dynamically generated by the SMs 450 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 400. An application may include instructions (i.e., API calls) that cause the driver kernel to generate one or more grids for execution. In one embodiment, the PPU 400 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 400 comprises X SMs 450 (X). For example, the PPU 400 may include 15 distinct SMs 450. Each SM 450 is multi-threaded and configured to execute a plurality of threads (e.g., 32 threads) from a particular thread block concurrently. Each of the SMs 450 is connected to a level-two (L2) cache 465 via a crossbar 460 (or other type of interconnect network). The L2 cache 465 is connected to one or more memory interfaces 480. Memory interfaces 480 implement 16, 32, 64, 128-bit data buses, or the like, for high-speed data transfer. In one embodiment, the PPU 400 comprises U memory interfaces 480(U), where each memory interface 480(U) is connected to a corresponding memory device 404(U). For example, PPU 400 may be connected to up to 6 memory devices 404, such as graphics double-data-rate, version 5, synchronous dynamic random access memory (GDDR5 SDRAM).

In one embodiment, the PPU 400 implements a multi-level memory hierarchy. The memory 404 is located off-chip in SDRAM coupled to the PPU 400. Data from the memory 404 may be fetched and stored in the L2 cache 465, which is located on-chip and is shared between the various SMs 450. In one embodiment, each of the SMs 450 also implements an L1 cache. The L1 cache is private memory that is dedicated to a particular SM 450. Each of the L1 caches is coupled to the shared L2 cache 465. Data from the L2 cache 465 may be fetched and stored in each of the L1 caches for processing in the functional units of the SMs 450.

In one embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, shader, geometry shader, pixel shader, etc. For example, the GMU 415 may configure one or more SMs 450 to execute a vertex shader program that processes a number of vertices defined by the model data. In one embodiment, the GMU 415 may configure different SMs 450 to execute different shader programs concurrently. For example, a first subset of SMs 450 may be configured to execute a vertex shader program while a second subset of SMs 450 may be configured to execute a pixel shader program. The first subset of SMs 450 processes vertex data to produce processed vertex data and writes the processed vertex data to the L2 cache 465 and/or the memory 404. After the processed vertex data is rasterized (i.e., transformed from three-dimensional data into two-dimensional data in screen space) to produce fragment data, the second subset of SMs 450 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 400 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 400 is embodied on a single semiconductor substrate. In another embodiment, the PPU 400 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 400 may be included on a graphics card that includes one or more memory devices 404 such as GDDR5 SDRAM. The graphics card may be configured to interface with a PCIe slot on a motherboard of a desktop computer that includes, e.g., a northbridge chipset and a southbridge chipset. In yet another embodiment, the PPU 400 may be an integrated graphics processing unit (iGPU) included in the chipset (i.e., Northbridge) of the motherboard.

Figure 5:
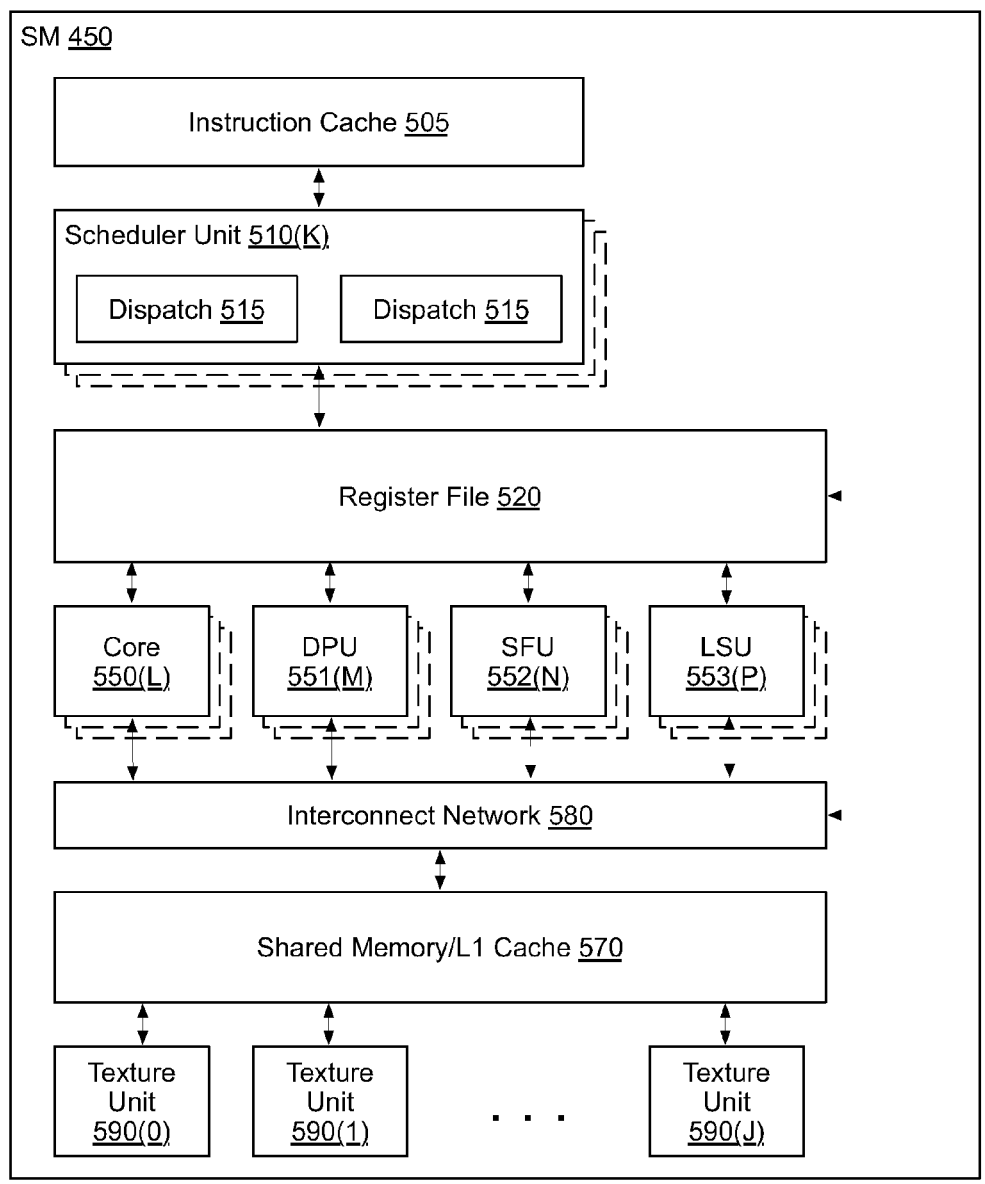
FIG. 5 illustrates the streaming multi-processor of FIG. 4, according to one embodiment.

FIG. 5 illustrates the streaming multi-processor 450 of FIG. 4, according to one embodiment. As shown in FIG. 5, the SM 450 includes an instruction cache 505, one or more scheduler units 510, a register file 520, one or more processing cores 550, one or more double precision units (DPUs) 551, one or more special function units (SFUs) 552, one or more load/store units (LSUs) 553, an interconnect network 580, a shared memory/L1 cache 570, and one or more texture units 590.

As described above, the work distribution unit 520 dispatches active grids for execution on one or more SMs 450 of the PPU 500. The scheduler unit 510 receives the grids from the work distribution unit 520 and manages instruction scheduling for one or more thread blocks of each active grid. The scheduler unit 510 schedules threads for execution in groups of parallel threads, where each group is called a warp. In one embodiment, each warp includes 32 threads. The scheduler unit 510 may manage a plurality of different thread blocks, allocating the thread blocks to warps for execution and then scheduling instructions from the plurality of different warps on the various functional units (i.e., cores 550, DPUs 551, SFUs 552, and LSUs 553) during each clock cycle.

The instruction cache 505 may store one or more multi-input bitwise logical operation instructions. The input operands specified by each multi-input bitwise logical operation instruction may be stored in the register file 520 and the result of the multi-input bitwise logical operation instruction may be written back to the register file 520. Each multi-input bitwise logical operation instruction is executed for one or more threads in a warp. One or more or the cores 550, DPUs 551, SFUs 552, and LSUs 553 may include a multi-input bitwise logical operation unit 200 and be configured to execute a multi-input bitwise logical operation instruction.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 450 includes a register file 520 that provides a set of registers for the functional units of the SM 450. In one embodiment, the register file 520 is divided between each of the functional units such that each functional unit is allocated a dedicated portion of the register file 520. In another embodiment, the register file 520 is divided between the different warps being executed by the SM 450. The register file 520 provides temporary storage for operands connected to the data paths of the functional units.

Each SM 450 comprises L processing cores 550. In one embodiment, the SM 450 includes a large number (e.g., 192, etc.) of distinct processing cores 550. Each core 550 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 450 also comprises M DPUs 551 that implement double-precision floating point arithmetic, N SFUs 552 that perform special functions (e.g., copy rectangle, pixel blending operations, and the like), and P LSUs 553 that implement load and store operations between the shared memory/L1 cache 570 and the register file 520. In one embodiment, the SM 450 includes 64 DPUs 551, 32 SFUs 552, and 32 LSUs 553.

Each SM 450 includes an interconnect network 580 that connects each of the functional units to the register file 520 and the shared memory/L1 cache 570. In one embodiment, the interconnect network 580 is a crossbar that can be configured to connect any of the functional units to any of the registers in the register file 520 or the memory locations in shared memory/L1 cache 570.

In one embodiment, the SM 450 is implemented within a GPU. In such an embodiment, the SM 450 comprises J texture units 590. The texture units 590 are configured to load texture maps (i.e., a 2D array of texels) from the memory 404 and sample the texture maps to produce sampled texture values for use in shader programs. The texture units 590 implement texture operations such as anti-abasing operations using mip-maps (i.e., texture maps of varying levels of detail). In one embodiment, the SM 450 includes 16 texture units 590.

The PPU 400 described above may be configured to perform highly parallel computations much faster than conventional CPUs. Parallel computing has advantages in graphics processing, data compression, biometrics, stream processing algorithms, and the like.

Figure 6:
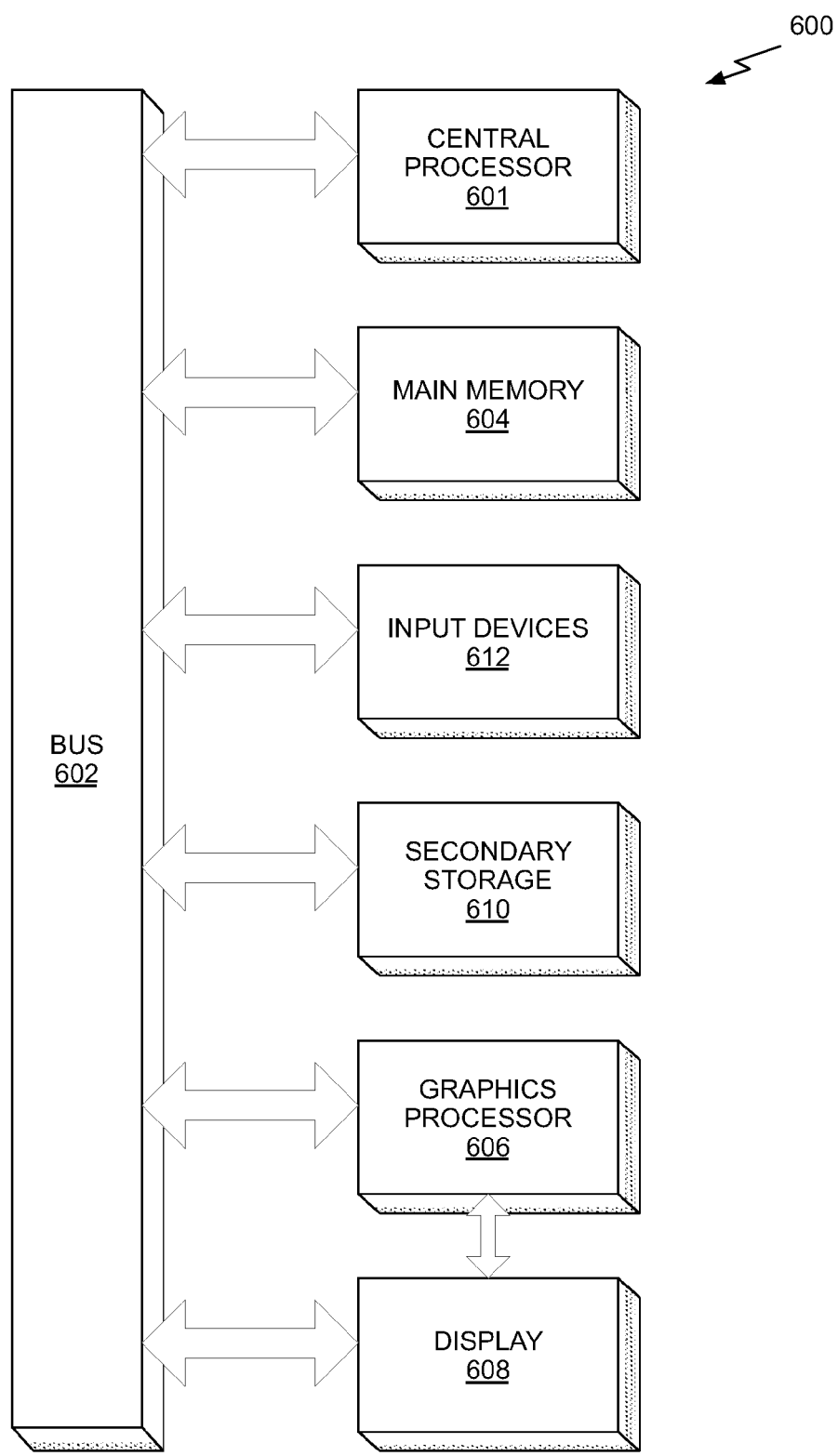
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (CPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a parallel processor, a multi-input bitwise logical operation instruction that specifies two or more input operands and a function operand, wherein a first input operand of the two or more input operands comprises a number of bits, each bit having a corresponding bit in each of the additional input operands in the two or more input operands, wherein a predicate operation controls whether individual threads in a group of threads execute a subsequent instruction without executing the multi-input bitwise logical operation instruction;
writing the function operand to a lookup table within the parallel processor; and
accessing the lookup table for each set of corresponding input operand bits in the two or more input operands to generate an output for the multi-input bitwise logical operation instruction.

2. The method of claim 1, further comprising reading at least one of the input operands or the function operand from a register.

3. The method of claim 1, wherein at least one of the input operands is a constant.

4. The method of claim 1, wherein the writing of the function operand and the accessing of the lookup table is performed in parallel for two or more threads in the group of threads.

5. The method of claim 1, wherein the function operand defines a bitwise logical operation to be performed on the two or more input operands.

6. The method of claim 1, further comprising, prior to the writing and accessing, determining that a particular thread in the group of threads is enabled for execution by the multi-input bitwise logical operation instruction according to the predicate operation.

7. The method of claim 5, wherein the bitwise logical function is performed using three input operands.

8. The method of claim 5, wherein the bitwise logical function is performed using two input operands.

9. The method of claim 5, wherein the bitwise logical function is performed using four or more input operands.

10. The method of claim 1, wherein the function operand is represented using $2^N$ bits, where N is the number of input operands.

11. A system comprising:
a multi-input bitwise logical operation unit configured to:
receive a multi-input bitwise logical operation instruction that specifies two or more input operands and a function operand, wherein a first input operand of the two or more input operands comprises a number of bits, each bit having a corresponding bit in each of the additional input operands in the two or more input operands, wherein a predicate operation controls whether individual threads in a group of threads execute a subsequent instruction without executing the multi-input bitwise logical operation instruction;
write the function operand to a lookup table; and
access the lookup table for each set of corresponding input operand bits in the two or more input operands to generate an output for the multi-input bitwise logical operation instruction.

12. The system of claim 11, further comprising a register file that is configured to store at least one of the input operands.

13. The system of claim 11, wherein at least one of the input operands is a constant.

14. The system of claim 11, wherein the multi-input bitwise logical operation unit resides within a multi-threaded processing unit that is configured to execute the multi-input bitwise logical operation instruction in parallel for two or more threads in the group of threads.

15. The system of claim 11, wherein the multi-input bitwise logical operation unit is further configured to determine that a particular thread in the group of threads is enabled for execution by the multi-input bitwise logical operation instruction according to the predicate operation.

16. The system of claim 11, wherein the function operand defines a bitwise logical operation to be performed on the two or more input operands.

17. The system of claim 16, wherein the bitwise logical function is performed using three input operands.

18. The system of claim 16, wherein the bitwise logical function is performed using two input operands.

19. The system of claim 16, wherein the function operand is represented using $2^N$ bits, where N is the number of input operands.

20. A non-transitory computer-readable storage medium storing instructions that, when executed by a processor, cause the processor to perform steps comprising:
receiving a multi-input bitwise logical operation instruction that specifies two or more input operands and a function operand, wherein a first input operand of the two or more input operands comprises a number of bits, each bit having a corresponding bit in each of the additional input operands in the two or more input operands, wherein a predicate operation controls whether individual threads in a group of threads execute a subsequent instruction without executing the multi-input bitwise logical operation instruction;
writing the function operand to a lookup table; and
accessing the lookup table for each set of corresponding input operand bits in the two or more input operands to generate an output for the multi-input bitwise logical operation instruction.

* * * * *